United States Patent [19]

Wallace

[11] 4,002,418
[45] Jan. 11, 1977

[54] CASTING APPARATUS
[75] Inventor: Henry W. Wallace, Southbridge, Mass.
[73] Assignee: American Optical Corporation, Southbridge, Mass.
[22] Filed: July 10, 1975
[21] Appl. No.: 594,905
[52] U.S. Cl. .............................. 425/425; 264/311; 425/434
[51] Int. Cl.² .......................................... B29C 5/04
[58] Field of Search ............ 425/425, 434; 264/311
[56] References Cited
UNITED STATES PATENTS

| 2,354,026 | 7/1944 | Jungersen | 264/311 X |
| 2,466,277 | 4/1949 | Rubissow | 264/311 X |
| 2,543,303 | 2/1951 | Rubissow | 264/311 X |
| 2,629,130 | 2/1953 | Rempel | 264/311 X |
| 2,633,605 | 4/1953 | Brucker | 425/434 X |
| 3,314,639 | 4/1967 | Barnett | 425/425 X |

Primary Examiner—Robert L. Spicer, Jr.
Attorney, Agent, or Firm—H. R. Berkenstock, Jr.; William C. Nealon

[57] ABSTRACT

A centrifugal casting mold and mold clamping system adaptable to mass-production technology including a tapered multiple part mold and similarly tapered sleeve within which the assembled mold is insertable for resin filling and centrifuging.

10 Claims, 12 Drawing Figures

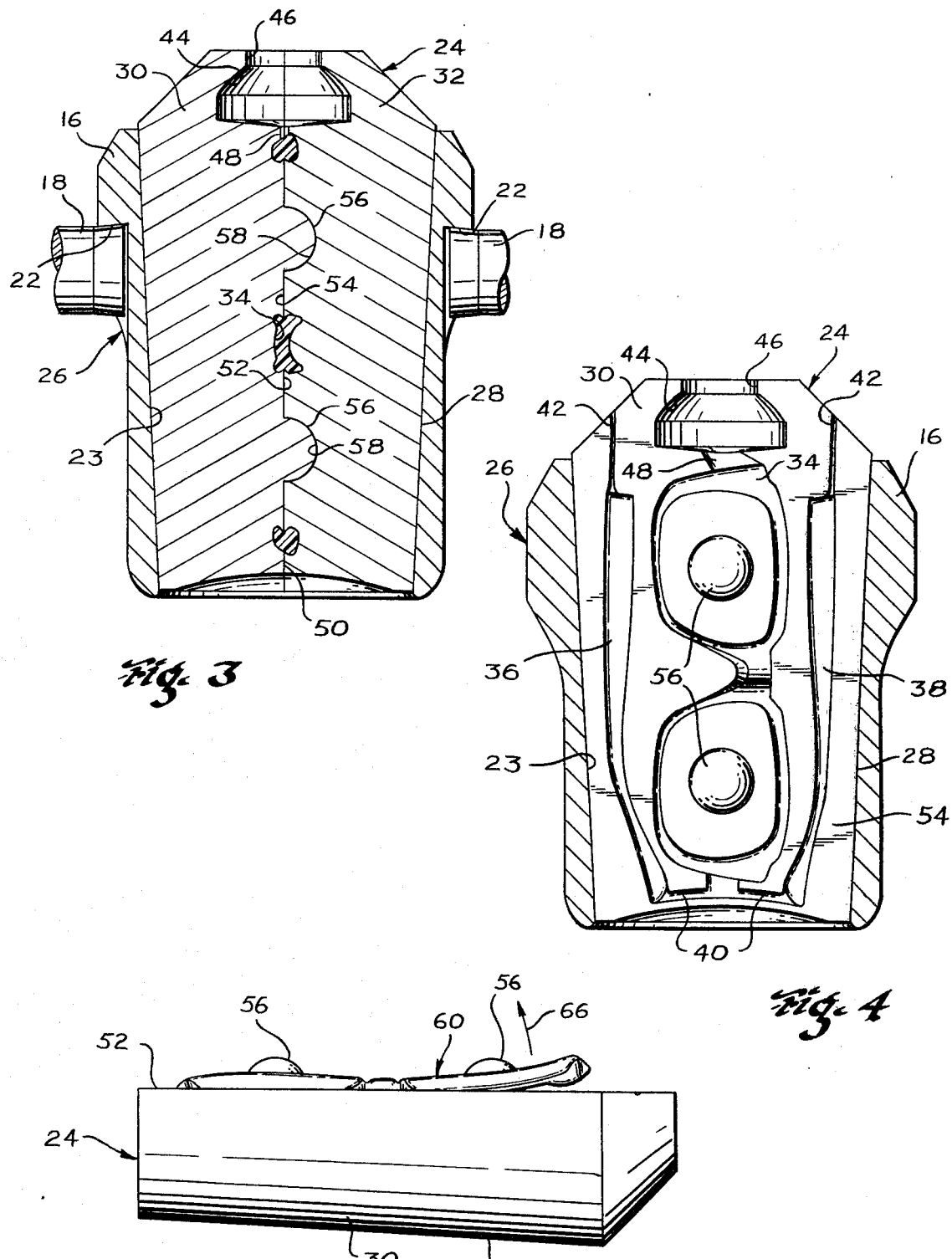

CASTING APPARATUS

BACKGROUND OF THE INVENTION

1. Field of the Invention:

Resin casting apparatus and method with particular reference to a mold and mold clamping system for use in a centrifugal casting operation.

2. Discussion of the Prior Art:

Resin casting operations such as, for example, the casting of spectacle frame front and temple components have hitherto involved molds and mold clamping hardware having serious drawbacks. Mainly, the prior art equipment has been oversized, heavy and generally nonportable, expensive and dependent upon external energy sources for mold clamping. For example, air operated presses have been used to perform the clamping function wherewith clamping forces upon closed mold halves are achieved by inflation of fiber-reinforced bladders.

In addition to the ungainliness of such equipment, clamping pressures are marginal and have less than optimum homogeneity of applied compressive stress distribution.

With the foregoing and corollary disadvantages of prior art equipment and methods in mind, a principal object of the present invention is to provide an improved resin casting method and apparatus including a novel centrifugal casting mold and mold clamping system which is of high capacity regarding clamping pressures, of high quality concerning homogeneity of applied compressive stress distribution and operable without external energy sources. A further object is to accomplish the foregoing with equipment which is compact, portable, light-weight, and inexpensive.

Other objects and advantages of the invention will become apparent from the following description.

SUMMARY OF THE INVENTION

In contrast to the kinematics and dynamics inherent in prior art molds and mold clamping hardware, the present invention provides mold-clamping action by means of force multiplication arising from the wedge principle in the form of a mating tapered multiple part mold and a one-part similarly tapered clamping sleeve.

In operation, i.e. under centrifuging, the taper provides a compressive force acting to clamp the mold parts together. An axial force acting to thrust the assembled part more tightly into the tapered sleeve, i.e. in the direction of diminishing volumetric accommodation, translates into an amplified compressive force clamping the mold parts effectively together. Further compressing the mold parts is a greater thermal expansion of mold parts than the clamping sleeve during curing of a resin being cast according to the invention.

The larger end of the assembled parts of the cone frustum mold may be provided with an internal reservoir area which is designed to accommodate a volume of liquid casting resin sufficient to at least completely fill the casting cavity during centrifuging and during the gelation phase of the resin which results in its volumetric contraction. Filling of the mold may then be accomplished without concern for air entrapment in the casting cavity which, during subsequent centrifuging, becomes displaced by the heavier resin. Ingress of air through interfaces of mold mating surfaces and consequential bubble blemishing of cast articles is avoided by the high clamping force developed by centrifuging of the mold into the sleeve and further by the aforesaid differential thermal expansion of the mold and clamping sleeve components.

Details of the invention will become more readily understood by reference to the following description when taken in conjunction with the accompanying drawings.

DESCRIPTION OF THE DRAWINGS

FIG. 3 is a cross-sectional view taken along line 3—3 of FIG. 1;

FIG. 4 is a cross-sectional view taken along line 4—4 of FIG. 1;

FIG. 5 is a side elevational view of one part of a casting mold containing a cast article which is partially removed from the mold part;

DESCRIPTION OF THE PREFERRED EMBODIMENT

Figure 1:
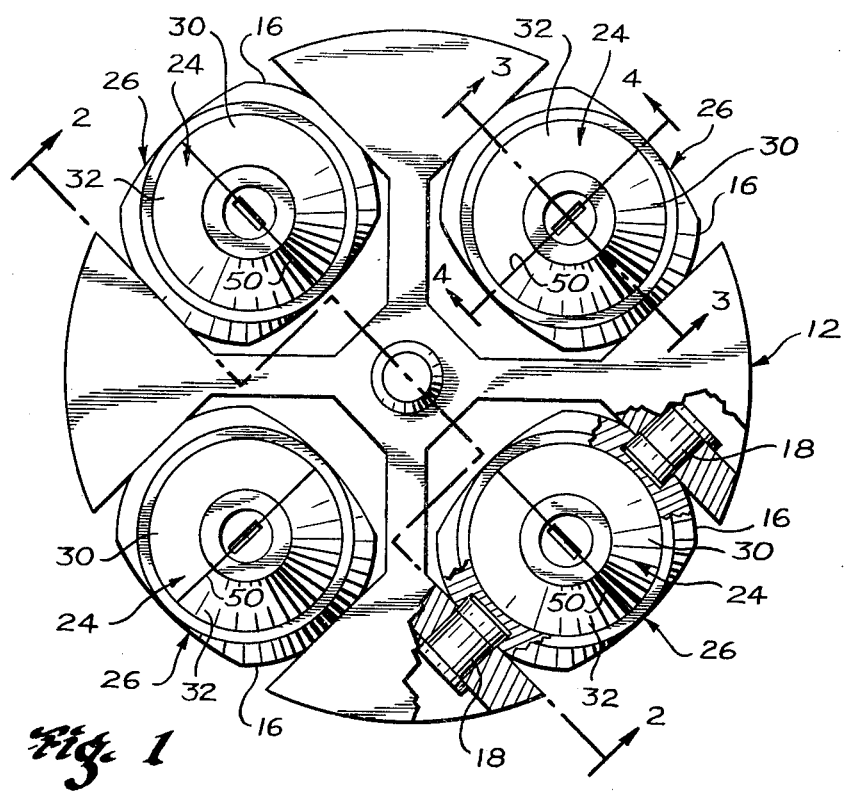
FIG. 1 is a plan view of a centrifuge containing casting apparatus according to the invention.
Figure 2:
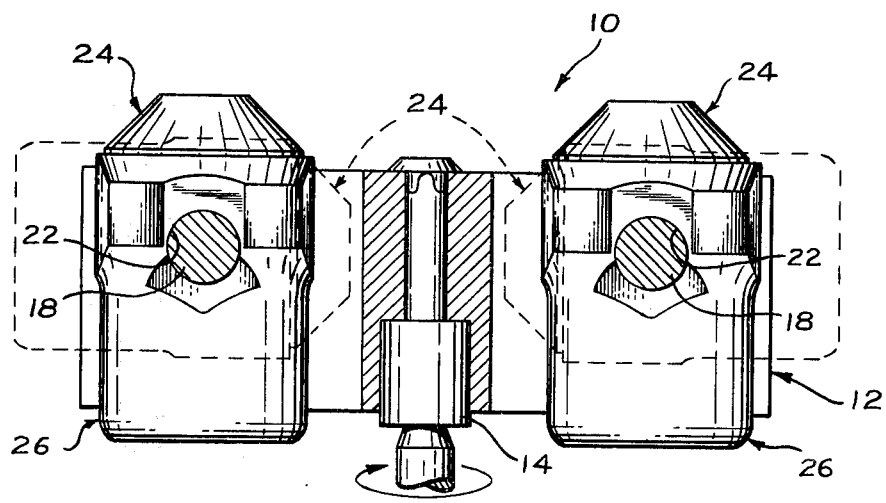
FIG. 2 is a cross-sectional view taken generally along line 2—2 of FIG. 1.

A typical centrifuge in accordance with the invention is diagrammatically illustrated in FIGS. 1 and 2 and comprises a rotor 12 and supporting spindle 14 which, in turn, is driven by a conventional power unit, not shown. As it is well-known, such power units ordinarily provide protection against rotor over-speeding and vibration from minor loading imbalance.

The drive mechanism, rotor housing and ancilliary centrifuge components are not shown or described herein since the invention is directed more particularly to resin casting molds and clamping sleeve construction which are adaptable to conventional centrifuging apparatuses.

The essential improvement whereby the present invention distinguishes over the prior art is provided by the arrangement of casting units 16 each including a swinging, tapered, moldclamping sleeve 26 detachably pivotally mountable upon pins 18 of rotor 12. Four such units are depicted in FIG. 1. Diametrically opposed semi-circular bearing sockets 22 (FIGS. 2 and 3) in each sleeve 26 provide the detachable journals of the casting units.

Sleeves 26 each have an internal locking taper 23 (FIGS. 3 and 4) which receives a multiple part mold 24 provided with a matching taper 28. Each casting unit 16 comprises the mated combination of a mold 24 and sleeve 26. According to one embodiment of the invention, each of molds 24 are of the two-piece type illustrated in FIGS. 3 and 4.

Mold halves 30 and 32 can be formed of an aluminum filled epoxy resin, exemplary of which is a commercially available resin identified in the trade as TC-5467 combined in the amount of 100 parts by weight with 8 parts by weight of a hardener known commercially as TH-3831. These exemplary resin and hardener constituents are sold by Hysol Division, Dexter Corporation, Olean, N.Y., U.S.A.

For purposes of illustration, casting cavities 34, 36 and 38 (approximately one-half of each of which is shown in FIG. 4) have been depicted as having shapes corresponding to those respectively of a spectacle frame front and each of a pair of spectacle frame temples. In this instance, cavities 34, 36 and 38 have interconnecting passageways 40 and vent openings 42 which facilitate their filling with a liquid casting resin. More, less and/or differently shaped casting cavities may, of course, be provided to suit particular requirements. For example, the cavities may be so constructed and arranged as to receive parts of spectacle frame hardware such as temple hinges, decorative plaques or the like around at least parts of which spectacle frame components are to be centrifugally cast.

Adjacent the uppermost end of mold 24, i.e. that of greatest cross-sectional dimension, there is provided a reservoir 44 having an inlet 46 and communication 48 leading into cavity 34.

Reservoir 44 is of such size as to support a quantity of liquid casting medium at least equal to that required to completely fill all of cavities 34, 36 and 38 including volumetric contraction due to resin gelation. Thus, upon charging mold 24 with a casting precursor through inlet 46, air entrapment in one or more of cavities 34, 36 and 38 preventing their immediate filling will be of no particular consequence. Displacement of such air will be effected by centrifuging as will be described in greater detail hereinafter.

Mold 24 is divided along a parting surface 50 (FIGS. 1 and 3) in a relief plane extending approximately centrally through the depth of cavities 34, 36 and 38.

Faces 52 and 54 of respective mold halves 30 and 32 are so constructed and arranged as to mate with precision when mold halves 30 and 32 are closed as depicted in FIGS. 1-3.

Interfitting protuberances 56 and sockets 58 are provided to facilitate the mating of the mold halves and to prevent relative longitudinal displacement thereof during use.

While the exact manner of accomplishing the aforesaid precision of interfacial mating of faces 52 and 54 is not of special importance to this invention, those interested in such details may, for example, achieve desirable results as follows:

Carefully prepared, preferably epoxy resin, models of articles to be subsequently cast in facsimile (e.g. a hand-tooled or machined spectacle frame front and two temple parts) are placed upon a platen having a hollow central portion filled with modeling clay, the models are imbedded in the clay to a depth of approximately one-half their thickness. The first mold half (e.g. mold half 30) may then be cast and cured over the platen and the exposed portions of the models to form the mold face (e.g. face 52) in conformance with the configuration of the platen surface and modeling clay surrounding the exposed models. Protruding portions of the models thus produce approximately one-half the depth of casting cavities 34–38. The thus cast mold half is removed from the platen with the article models in place therein. A commercially available release agent such as that known in the trade as AC4-4368, manufactured by Hysol Division, Dexter Corporation, is applied to face 52 and a second mold half 32 is cast over the first mold half to complete the mold cavities. By this technique, face 54 of the second cast mold half 32 is formed directly from face 52 of the first cast mold half 30 so that precision mating of these faces 52 and 54 is accomplished. It should be understood that reservoir 44, protuberances 56, sockets 58, passages 40, inlets 46 and vent openings or the like may be formed in a manner similar to the aforesaid formation of casting cavities 34, 36 and 38 i.e. with preformed models or patterns corresponding in shape to that desired of such portions of the mold. Reservoir 44, passages 40 and/or vent openings 42 may, however, be machined or hand-tooled after casting of the mold halves, as may other portions of the casting cavities, if desired.

Having thus formed casting cavities 34, 36 and 38 and faces 52, 54, the mold halves, in assembled relationship, may be externally machined to a desired shape, size and taper.

Curing of the thus formed mold 24 with the models in place, prior to its use in a centrifugal casting operation, is necessary and may be accomplished as follows:

The cast and assembled mold with its cavity forming models in place is positioned in a preheated oven and held at approximately 52° C for a period of approximately 2 hours whereupon the oven temperature is raised in increments of approximately 12° C up to approximately 121° C with a hold period of approximately 1 hour following each incremental increase in temperature. Upon completion of this approximately 7 hour curing cycle, the mold is opened and the models are removed. The mold is then allowed to cool to room temperature. Various other curing times, temperatures and cycles may be used according to known techniques for curing epoxy resins, the foregoing having been given for purposes of illustration only.

The thus cured mold 24 is next subjected to a final closing operation, i.e. to produce a maximum of preciseness in mating of its surfaces 52 and 54. To this end, the assembled mold halves 30 and 32 are placed in an internally tapered closing sleeve which is similar or may be identical in construction to sleeve 16. Essentially, the closing sleeve (not shown) comprises a relatively thick-walled tube of steel or other similarly sturdy material having an internal taper matching that provided externally upon mold 24. The external size and/or wall thickness of the closing sleeve is such that the sleeve will resist axially directed forces considerably in excess of 5,000kg without becoming damaged or appreciably distorted.

Exemplary but not necessarily restrictive closing forces, temperatures, time schedules and steps applicable to successful final closing of a mold 24 are:

1. Applying a force of from approximately 500 to 750kg axially upon mold 24 driving the mold into the taper of the closing sleeve toward its end of diminishing volumetric accommodation;

2. Heating the mold while under such force to a temperature (e.g. 149° C) sufficient to cause surfaces 52 and 54 to become workable into exact mating relationships by a coining action resulting from lateral translation of the applied axial force; and 3. Allowing the mold to cool to a suitable handling temperature, preferably room temperature, and removing it from the closing sleeve.

Sleeves 26 of casting units 16 (FIGS. 3 and 4) which receive molds 24 for centrifuging as illustrated in FIGS. 1 and 2 are preferably formed of a material (e.g. steel) having a lower coefficient of expansion than the aluminum-filled epoxy mold halves wherewith this expansion differential can contribute to forces compressing the mold halves together during a centrifugal casting operation.

Geometrically, sleeves 26 are held to the maximum reasonable tolerances possible in maintaining an identity in their shapes, weight and locations of bearing sockets 22 for accomplishing the best possible balance in centrifuge 10. Similarly, molds 24 are preferably held to equivalent degrees of geometrical identity in their respective shapes, sizes and weights. Bearing sockets 22 of sleeves 26 are so located thereon as to cause all casting units 16 to automatically and freely pivot so as to assume a vertical relationship as shown with full line illustration in FIGS. 1 and 2 when initially mounted in centrifuge 10, i.e. with the centrifuge at rest.

During centrifuging, however, the lowermost ends of casting units 16 swing upwardly and outwardly with respect to rotor 12 about pins 18 by amounts according to the rotational speed of rotor 12. At a maximum rotor speed contemplated according to this invention, casting units 16 may approach or actually reach the horizontal dispositions shown by dot-dash outline in FIGS. 2.

THE CASTING OPERATION

Centrifugal casting operations perfomed with the abovedescribed apparatus, i.e. with assembled casting units 16 in particular, are accomplished as follows:

Among various commercially available casting materials, a preferred material for casting spectacle frame components is an epoxy precursor of resin and hardener.

As a specific example, a useful precursor is a commercially available bispherol A type and epichlorohydrin epoxy yielding composition called Hysol R-9-2039 manufactured by the Hysol Division, Dexter Corporation mixed on a basis of 100 to 30 parts by weight of the R-9-2039 to a two-part amine hardener consisting of 60 parts by weight of one commercially available hardener identified in the trade as H2-3561 and 40 parts by weight of another commercial hardener identified as H3840; both hardeners also being manufactured by Hysol Division, Dexter Corporation.

Casting cavities 34, 36, 38 and faces 52, 54 of mold halves 30 and 32 are coated with a thin barrier-release agent which is impermeable by the resin precursor and readily releasable therefrom after its curing in mold 24. Polyvinyl alcohol is exemplary of such a barrier-release agent. It may be painted or preferably spray coated upon the mold halves. Other barrier-release agents known to the artisan may be used.

Casting units 16 are prepared for charging with the casting precursor by inserting within the taper of each sleeve 26 and assembled mold 24. The respective tapers of each sleeve 26 and mold 24 assembly are locked together by application of an axially directed force of, for example, 160kg upon mold 24 tending to drive the mold into the sleeve taper.

A lubricant may be applied between the mating conical segment surfaces of the sleeve and mold, if desired, to facilitate release of the mold after the casting operation is completed.

The liquid mixture precursor is heated to a temperature of approximately 30° C or within a range of from approximately 27° C to approximately 32° C and poured through inlet 46 into each mold 24 (four molds being required to load the particular centrifuge illustrated in FIGS. 1 and 2). Casting units 16 are preheated to approximately 88° C prior to charging with the casting precursor. Pressure filling with direct coupling to molds 24 may be employed to reduce air entrapment in the molds. However, prior art concern for air or gases being carried in or along with the mold precursor and/or bubble entrapment in the casting cavities is not problematic. As pointed out above, subsequent centrifuging will displace all such air or gases with the liquid mixture precursor which is held at approximately the aforesaid temperature to maintain its freely flowable state at least until air and gas displacement can take place.

After charging the preheated molds with the epoxy precursor, units 16 are placed in centrifuge 10 upon pins 18. At this point, the ambient temperature in the centrifuge (i.e. the atmosphere surrounding rotor 12) has been preheated to a temperature within a range of from approximately 82° C to 93° C (e.g. preferably about 88° C).

Rotor 12 is brought to a speed of rotation developing a mean centrifugal force of approximately 3000kg; this force tending to drive molds 24 axially into sleeves 26 toward their ends of diminishing volumetric accommodation.

A ten minute cycle of centrifuging at a mean value of approximately 1480 g under a controlled substantially constant ambient temperature of approximately 88° C has been found to produce desirable results of blemish free article casting.

In such an operation, the mating taper of mold and sleeve of each casting unit 16 provides a high compressive force acting to clamp the two mold halves together.

For example, a taper of 0.04168 cm. slope per cm. gradient provides a stress mechanical advantage of 24:1 such that an axial force acting on the assembled mold halves, so as to thrust them more tightly into the tapered mold sleeve and taking the conical surface coefficient of friction into account, translates into an amplified compressive force clamping the mold halves effectively together. If the two mold halves, plus the resin precursor in the casting cavities were to weigh 507 grams and were subjected to an average 1500 g of centrifuging, this axial force would amount to 761 kilograms and translate into a lateral compressive force of approximately 302 kg/cm$^2$.

Contributing further to this compressive force is that created by the thermal expansion differential of the aluminum filled epoxy mold halves 30 and 32 and the tapered steel sleeve 26. This being volumetrically by a factor of approximately three, a temperature increase of approximately 64° C can result in a radial dimensional interference of 0.0025 cm.

The combined-action compressive force of centrifuging and thermal expansion under the above temperatures and g forces has been calculated to exceed 700 kilograms per square centimeter. This contrasts with the prior art mold clamping air-operated press force which typically was 10.9 kilograms per square centimeter.

A further advantage of the casting apparatus of this invention over prior art systems which utilized heated platens, one against each side of a pair of pressed together flat mold halves, is the exposure of greater mold surface area for greater and more uniform heat flow transfer by conduction from the clamping sleeve 26 into mold 24 and vice versa. This provides for greater control of heating of the casting resin in the mold and/or dissipation of excess heat resulting from exothermic reaction.

Mold 24 surface contact with sleeve 26 is contemplated to be well in excess of 84 percent, e.g., as much as 95 percent of the total mold surface area may be made available for conduction heating and/or cooling through sleeve 26. Heretofore, less than 65 percent of molds surface areas were contacted by heating platens.

It is pointed out that by means of such improvements in heat flow transfer into and from mold 24, in combination with the aforesaid combined-action high compressive (closing) force applied to each mold 24 during centrifuging, improved blemish-free accurately-formed castings may be expected.

Initially entrapped air and/or gases are centrifuged out of the mold cavities (i.e. displaced by the heavier casting resin) and ingress of air through mating surfaces 52 and 54 which would ordinarily produce bubble blemishing of the cast articles is prevented. In spite of uneven exothermic reaction in respectively thick and thin portions of the cast articles tending to form evacuated spaces by migration of the casting material, the high mold clamping forces developed by this invention prevent air intrusion through the interface of mated surfaces 52 and 54.

Upon completion of the centrifugal casting-curing cycle, rotor 12 is halted with temperatures of the casting unit 16 held at approximately 79° C, i.e. preferably within a range of from 77° to 82° C.

Figure 6:
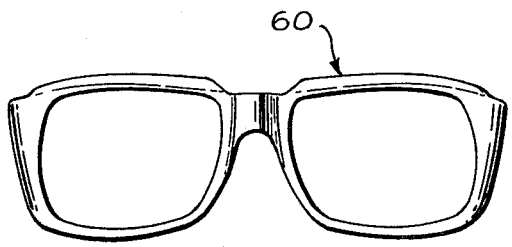
FIG. 6 is a front elevational view of an exemplary article cast according to the invention, the article being a spectacle frame front.
Figure 7:
FIGS. 7 and 8 are side views of spectacle temples cast according to the invention.
Figure 8:

Units 16 are lifted away from rotor 12, molds 24 are removed from sleeves 26 and opened for removal of the cast articles which may comprise, as illustrated, a spectacle frame front 60 and a pair of spectacle temples 62 and 64 (FIGS. 6, 7 and 8).

These cast articles, at the temperature of approximately 79° C, may be "peeled" away from the particular mold half 30 or 32 in which they tend to remain after mold opening. FIG. 5 depicts an exemplary situation where a spectacle frame front 60 is in the process of being peeled or lifted in a direction of arrow 66 out of mold half 30.

Following their removal from molds 24, all cast articles are suspended in air until they become fully cooled and rigid. Thereafter, they are post cured by exposure to heat of a temperature of approximately 82° C for a period of approximately two hours.

Cooling again to room temperature, finishing by tumbling, removal of any sprues of the like, dyeing and assembling with spectacle hardware completes the product.

Figure 9:
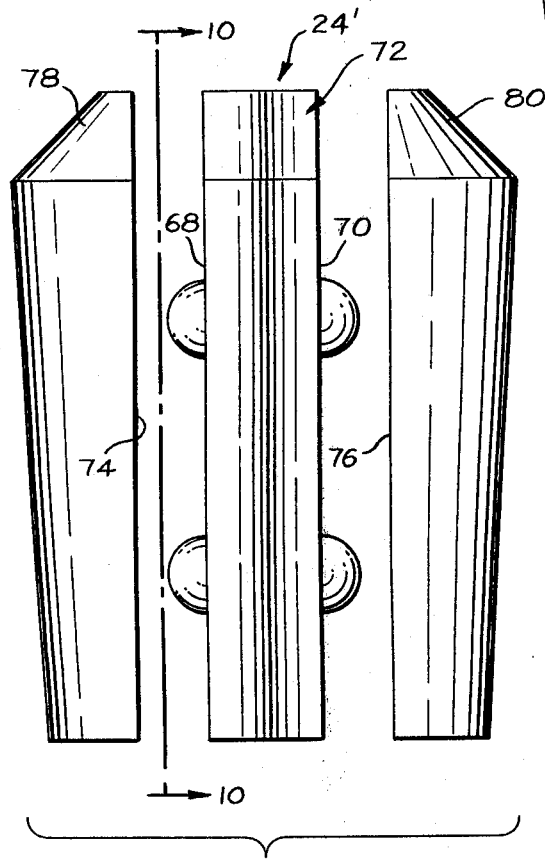
FIG. 9 is a side elevational view of a modified multiple part casting mold, the parts being illustrated in a disassembled relationship.
Figure 10:
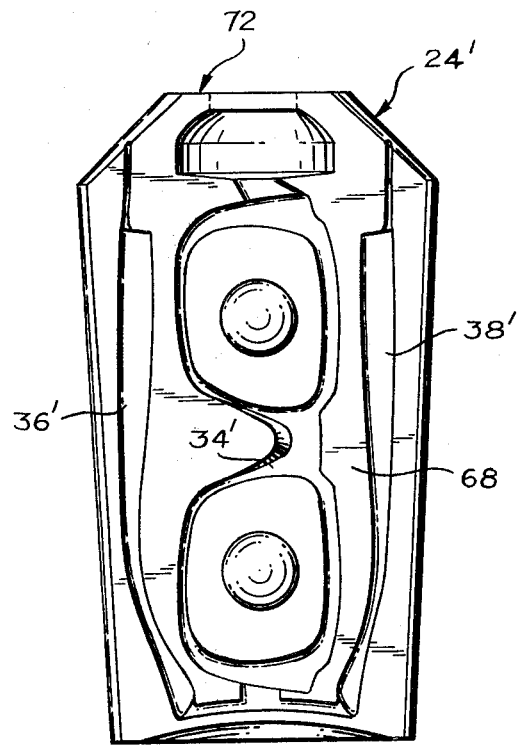
FIG. 10 is a view taken along line 10—10 of FIG. 9.

In FIGS. 9 and 10, there is illustrated a modification of the invention wherein casting mold 24' is comprised of three parts rather than the above-described two parts of mold 24. By such construction, mold 24' may be provided with double the casting capacity of mold 24. To this end, opposite sides 68 and 70 of the central part 72 of mold 24' are each provided with a number of casting cavities 34', 36' and 38' (FIG. 10), e.g. for casting against each of sides 68 and 70 a spectacle frame front and two spectacle temple components similar to articles 60, 62 and 64 of FIGS. 6, 7 and 8. The portions of these cavities 34', 36' and 38' in part 72 are of approximately one-half the depth required and are completed by mating cavity portions in each of sides 74 and 76 of the outer parts 78 and 80 respectively of mold 24'.

Techniques used for producing the dual set of cavities 34', 36' and 38' in sides 68, 74 and 70, 76 and for producing precision mating of these sides, as well as external and all other geometrical configurations of the three-part mold 24' are preferably identical to those described hereinabove respecting mold 24. Accordingly, such details will not be repeated here; it being understood that all centrifugal casting molds contemplated according to this invention, whether comprised of 2, 3 or more parts may be prepared as suggested with respect to mold 24 or by whatever other expedients may be preferred by the artisan.

It is to be further understood that casting cavities provided between mating sides 68 and 74 of mold 24' need not be identical to those provided between sides 70 and 76. A multiplicity of all differently shaped articles may be simultaneously cast in mold 24' if desired. Also, central part 72 may be divided to provide therein a third set of casting cavities, not shown.

While the mold faces, e.g. faces 52 and 54, 68 and 74, 70 and 76 of molds 26 and 26' respectively have been ullustrated as being parallel to each other and parallel to the taper axes of these molds, they may be formed nonparallel to each other and parallel or nonparallel to the particular taper axis to suit particular requirements. Mold faces approaching and/or disposed normal to a taper axis will, however, receive the least clamping action during centrifuging according to the invention.

Figure 11:
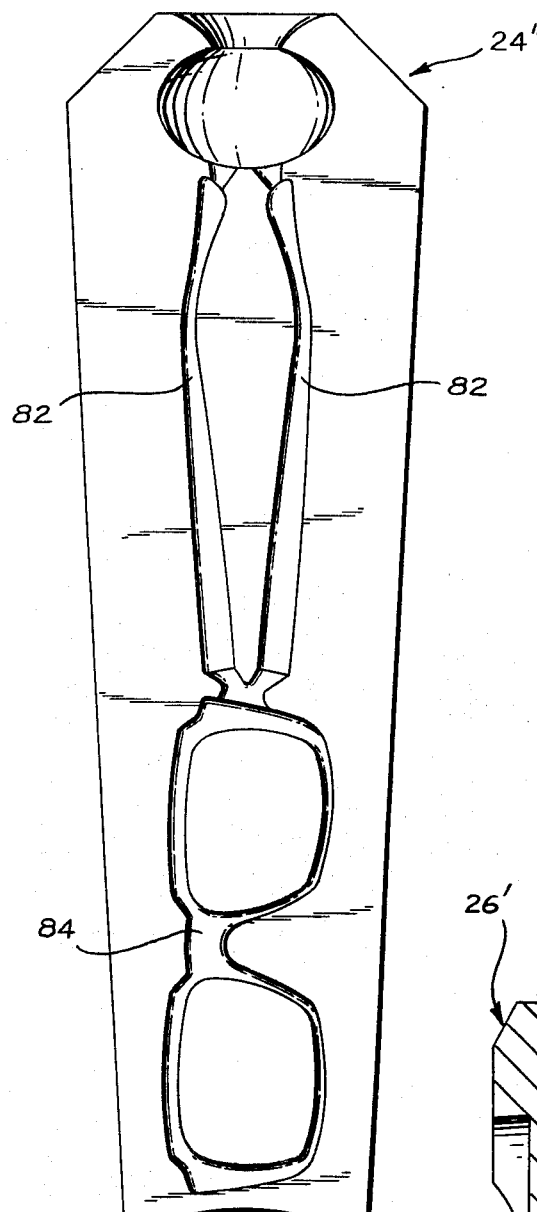
FIGS. 11 and 12 are illustrations of further modifications of the invention.

A further modification of the invention is illustrated in FIG. 11 wherein casting mold 24' is provided with an in-line arrangement of a pair of spectacle temple casting cavities 82 and a spectacle front casting cavity 84.

Gas bubble entrapment and gelation-shrink in cavities have been found to be less apt to occur in spectacle temple casting than in frame front casting. Thus, by locating casting cavity 84 deeper in mold 24' than cavities 82, which will place cavity 84 further from the center of rotation of a centrifuge receiving the mold, greater centrifugal forces concomitantly acting with the increased hydraulic head, will be applied to casting precursor in cavity 84 than in cavities 82. This produces a correspondingly greater gas displacement force in the more difficult to evacuate cavity 84 while applying greater hydraulic pressures to overcome the gelation-shrink cavity formation forces.

Figure 12:
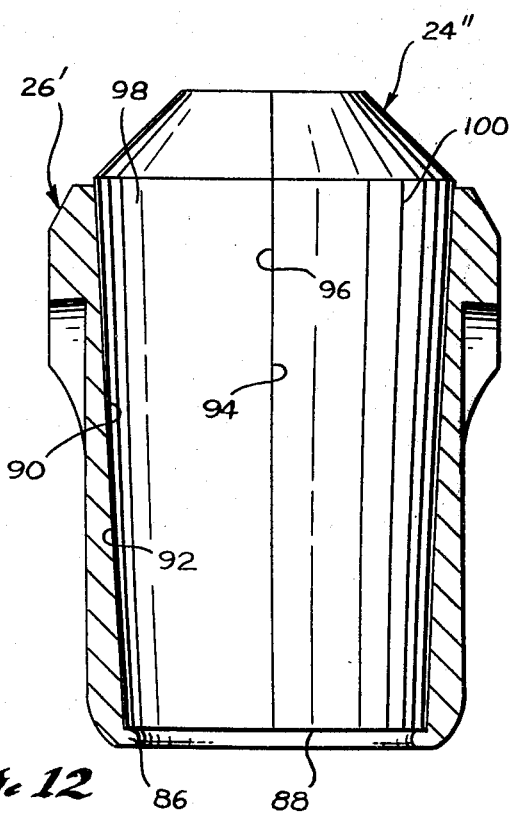

A modified mold clamping sleeve 26' is illustrated in FIG. 12.

Sleeve 26' is provided with a radially inwardly directed flange 86. Flange 86 receives the end 88 peripheral area of a casting mold 24' and prevents unnecessary longitudinal movement of mold 24' into sleeve 26' during centrifuging.

Matching internal and external tapers 90 and 92 of sleeve 26' and mold 24' respectively are of such pre-controlled diametral sizes as to afford a lateral closing force against faces 94 and 97 of mold halves 98 and 100 which is fully adequate according to the invention at or prior to the time that mold 24' became forcibly seated against flange 88.

Depending upon the following factors which are: the particular material composition of the tapered mold 24' regarding its ductility property; the dimensional configuration of the mold, especially with respect to the degree of taper applied; the amplitude of the centrifugal forces acting upon the mold; the temperatures of the mold 24' and its containing sleeve 26' during centrifugation; and the load bearing properties of the mold release lubricant applied between the two mating conical segment surfaces of the mold and sleeve respectively; the value of the inwardly-configured flange 86, which differentiates this tapered sleeve from the tapered sleeve of FIGS. 1–4, is determined. If the aforementioned factors are of combinations which permit shifting of a mold within its sleeve so as to move deeper within the taper of, for example, the tapered sleeve of FIGS. 1–4, while under centrifugation, a state of unacceptable dynamic imbalance is established considering that this shifting of mass center cannot be expected to have occurred simultaneously to the counterbalancing sleeve/mold combination of the centrifuge rotor assembly. Therefore, in order to prevent such shifting of a tapered mold within its tapered sleeve, the tapered sleeve concept of FIG. 12 is utilized such that the tapered mold 24′ is forcibly seated within sleeve 26′ until the mold bottom periphery presses against the ledge surface formed by flange 86. An additional advantage of this flange is control of a maximum mold closing pressure thus assuring a governed limit to the force required to extract the tapered mold 24′ from the tapered sleeve 26′ after centrifugation.

The embodiments of the invention described above for purposes of illustration are not to be interpreted as restrictive of the invention beyond that necessitated by the following claims. Those skilled in the art will readily appreciate that various modifications and adaptations of the precise forms here shown may be made to suit particular requirements. It is accordingly intended that such modifications which incorporate the novel concept disclosed are to be construed as coming within the scope of the claims or the range of equivalency to which they are entitled in view of the prior art.

I claim:

1. Centrifugal casting apparatus comprising the combination of:

a mold having an internal casting cavity with communication into said cavity adjacent a first end of the mold, an opposite second end of the mold normally being closed, said mold further being exteriorly tapered from a point adjacent said first end thereof inwardly toward and extending to said opposite second end;

a mold clamping sleeve having an internal taper substantially matching the external taper of said mold for receiving the mold, and external portions of said sleeve being constructed and arranged to adapt said sleeve to a centrifuge.

2. Apparatus according to claim 1 wherein said mold comprises a multiplicity of juxtapositionable casting sections between each adjoining pair of which there is provided at least one casting cavity surrounded by matching face portions wherewith said cavities may be peripherally sealed against ingress of air and gases when said separable casting sections are interfacially mated within said sleeve and centrifically driven into said internal taper of said sleeve in a direction toward its end of diminishing volumetric accommodation.

3. Apparatus according to claim 2 wherein there is a multiplicity of casting cavities between each pair of separable casting sections of said mold.

4. Apparatus according to claim 3 wherein said multiplicity of cavities are intercommunicated.

5. Apparatus according to claim 2 wherein said separable casting sections number three and extend longitudinally of said mold, the intermediate of said three casting sections forming with each of the remaining two casting sections one of said adjoining pair at each of its opposite sides, said intermediate casting section thus being common to said two pairs of interfacially mateable casting sections.

6. Apparatus according to claim 2 wherein the portion of said mold extending from said point adjacent said one end to said second end is frustoconical.

7. Apparatus according to claim 2 wherein said mold has a greater coefficient of thermal expansion than said sleeve.

8. Apparatus according to claim 2 wherein said external taper of said mold and said internal taper of said sleeve are locking tapers.

9. Apparatus according to claim 2 wherein, in addition to said casting cavities, there is included a reservoir space adjacent said one end of the mold and a passageway interconnecting said reservoir space and casting cavities, said reservoir space being of a size supportable of a quantity of casting material at least equal to that required to fill all casting cavities of said mold.

10. Apparatus according to claim 2 wherein said mold is formed of an aluminum filled epoxy resin and said clamped sleeve is formed of steel.

* * * * *